United States Patent [19]

Chiaramonte et al.

[11] Patent Number: 5,219,444
[45] Date of Patent: Jun. 15, 1993

[54] MOTOR VEHICLE HEADLIGHT HAVING REDUCED UV RADIATION EMISSION

[75] Inventors: Giancarlo Chiaramonte, Bodelshausen; Peter Kusserow, Sonnenbuehl-Undingen, both of Fed. Rep. of Germany

[73] Assignee: Robert Bosch GmbH, Stuttgart, Fed. Rep. of Germany

[21] Appl. No.: 918,267

[22] Filed: Jul. 22, 1992

[30] Foreign Application Priority Data

Aug. 1, 1991 [DE] Fed. Rep. of Germany ....... 4125478

[51] Int. Cl.$^5$ ............................................. B60Q 1/00
[52] U.S. Cl. ........................................ 362/61; 362/293
[58] Field of Search ................................. 362/61, 293

[56] References Cited

U.S. PATENT DOCUMENTS

| | | | |
|---|---|---|---|
| 4,985,816 | 1/1991 | Seko et al. | 362/61 |
| 5,130,904 | 7/1992 | Ohshio et al. | 362/61 |
| 5,161,875 | 11/1992 | Sekiguchi et al. | 362/61 |

FOREIGN PATENT DOCUMENTS 3519611 5/1985 Fed. Rep. of Germany .

Primary Examiner—Carroll B. Dority
Attorney, Agent, or Firm—Michael J. Striker

[57] ABSTRACT

The motor vehicle headlight includes a gas discharge lamp, a reflector for collecting and directing the light from the light source through an outlet opening, a light window covering the outlet opening, a disk-like filter at least partially absorbing UV radiation generated by the gas discharge lamp located between the gas discharge lamp and the light window in a path of the light transmitted directly transmitted to the light window and reflected from the reflector, at least one electrical conductor arranged on the filter so that, when the filter is broken, the electrical conductor is broken, and a control unit having a safety circuit connected directly to the electrical conductor by two lines. The safety circuit is structured and connected to the gas discharge lamp so that the gas discharge lamp is turned off by the safety circuit when the electrical conductor is broken.

11 Claims, 3 Drawing Sheets

MOTOR VEHICLE HEADLIGHT HAVING REDUCED UV RADIATION EMISSION

BACKGROUND OF THE INVENTION

The present invention relates to a headlight for a motor vehicle.

The invention particularly relates to improvement of the headlight described in German Patent Application 35 19 611. This headlight has a gas discharge lamp as a light source, a reflector for collecting and directing the light from the light source and a light window covering the light outlet opening of the headlight.

In the headlight of German Patent Application 35 19 611 the light source is mounted in the reflector. The gas discharge lamp is supplied by a control unit with the high voltage required for its operation. The light outlet opening of the headlight is covered with a light window. The gas discharge lamp produces visible light and also UV light with high intensity. This UV radiation is harmful to human health and can damage plastic and glass. In the known headlight no protective features are provided to prevent action of UV light on the headlight components or emission of UV light from the headlight.

SUMMARY OF THE INVENTION

It is an object of the present invention to provide a headlight for a motor vehicle of the above-described type, which has none of the above described disadvantages.

According to the invention, a disk-like filter, which absorbs at least partially UV light, is mounted between the gas discharge lamp and the light window in the path of the light rays directly transmitted to the light window and reflected from the reflector, and at least one electric conductor is associated with the filter, which is broken when the filter is broken and which is connected by two electrical lines to a safety circuit of a control unit, the gas discharge lamp being turned off by the safety circuit when the electrical conductor is broken.

The headlight according to the invention has the advantage that harmful UV radiation directed toward the light window from the gas discharge lamp is absorbed by the filter and thus no UV radiation with a harmfully high intensity is emitted from the headlight. The safety circuit of the control unit and the electric conductor on the filter guarantee that the gas discharge lamp can be operated *only* with the UV filter installed and intact.

Other embodiments of the invention are possible. The filter can be attached to or mounted on the front edge of the reflector. This guarantees that no harmful UV radiation is emitted and impinges on the internal surfaces of the housing of the headlight. The electrical conductor arranged on the filter can be a conductive strip applied to or on the filter, can be part of the filter or can be a wire with several segments running across the filter.

In one preferred embodiment of the invention the electrical conductor associated with the filter and the two lines associated with the electrical conductor have a predetermined resistance and a predetermined voltage drop occurs across the intact electrical conductor and the two lines as detected by the safety circuit. The safety circuit is designed so that operation of the gas discharge lamp is prevented when the voltage varies from the predetermined voltage drop measured when the electrical conductor on the filter is intact. Thus in this preferred embodiment inadvertent operation of the discharge lamp when the two lines are shorted out as a result of breakage of the filter and the electrical conductor on it is prevented.

In another advantageous embodiment of the invention a holder is provided on the reflector which holds the filter, the electrical conductor on the filter in the holder is connected with the two lines and this connection is interrupted, when the filter is loosened from the holder. Then power to the gas discharge lamp is interrupted as a result of an impact loosening the filter from the holder.

BRIEF DESCRIPTION OF THE DRAWING

The objects, features and advantages of the present invention will now be illustrated in more detail by the following detailed description, reference being made to the accompanying drawing in which.

DETAILED DESCRIPTION OF THE PREFERRED EMBODIMENTS

Figure 1:
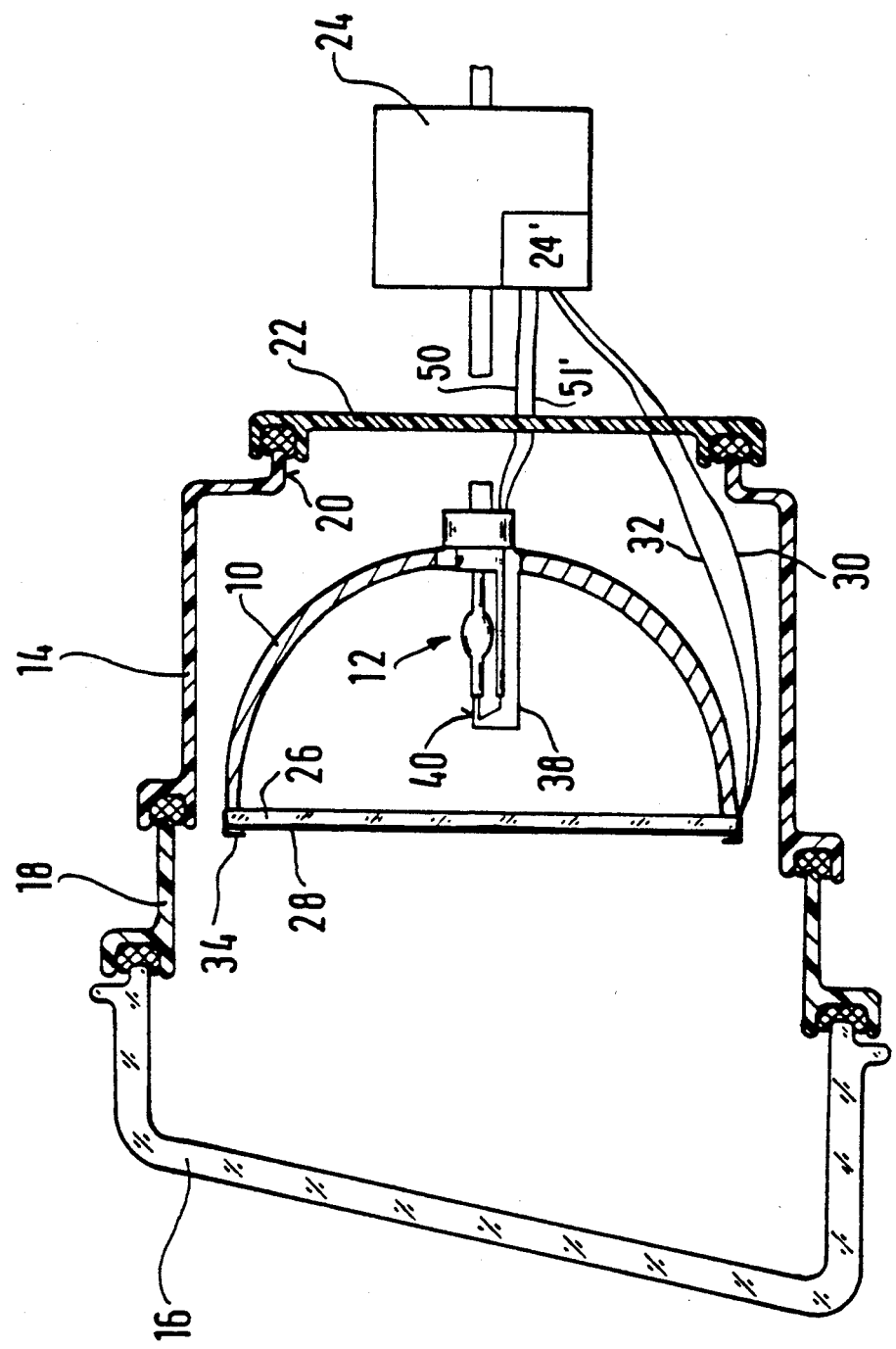
FIG. 1 is a longitudinal cross-sectional view through one embodiment of a headlight according to the invention.

An antiglare headlight for a motor vehicle shown in FIG. 1 has a reflector 10, in which a gas discharge lamp 12 is installed from its rear side. The reflector 10 is located in a housing 14, which is made from plastic. The light outlet opening of the headlight is covered with a light window 16, which is mounted on the front edge of the housing 14 by a subframe 18. The subframe 18 can similarly be made from plastic. The light window 16 can be made from glass or plastic. The housing 14 has on its rear side an opening 20, through which the gas discharge lamp 12 is accessible and is closable by a cap 22. The gas discharge lamp 12 is connected with a control unit 24, which again is connected with unshown elements of the power supply of the motor vehicle. In the control unit 24 the high voltage required for the operation of the gas discharge lamp 12 is produced from the voltage applied to the power supply and applied to the discharge lamp 12 over power conductors 50,51'. The control unit 24 contains moreover additional electronic components 24 to allow a rapid ignition and a stable operation of the gas discharge lamp 12.

A disk-like filter 26 is located in the path of the light reflected directly from the reflector 10 and emitted directly to the light window 16. The filter 26 absorbs the UV radiation emitted by the gas discharge lamp 12. The filter 26 can be made of glass, which has the property of absorbing UV light or radiation because of the presence of suitable additives. The filter 26 can also be a pane of glass, on which a layer of UV light absorbing material is applied. The filter 26 is advantageously mounted on the front edge of the reflector 10, so that no UV radiation with a harmfully high intensity can be emitted from the reflector. Thus it is guaranteed that UV light cannot pass out from the headlight by leaking from the headlight housing 14 or the subframe 18.

Figure 2:
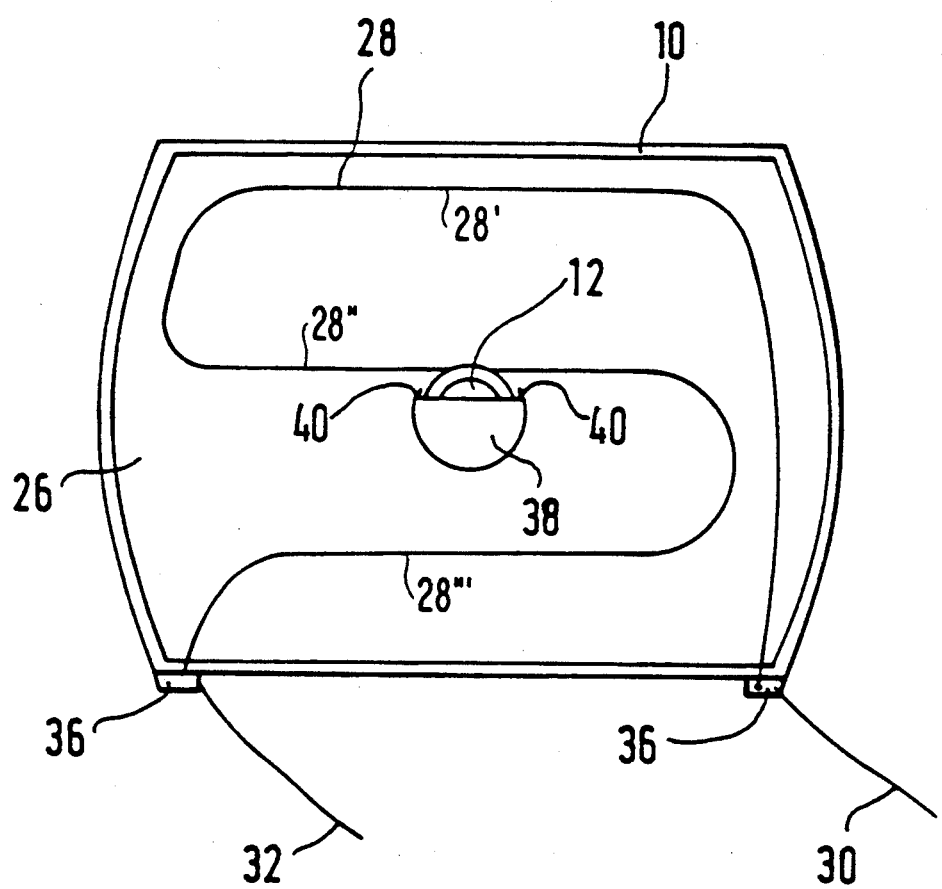
FIG. 2 is a front plan view of the reflector of the headlight of FIG. 1 with the filter held in place.
Figure 3:
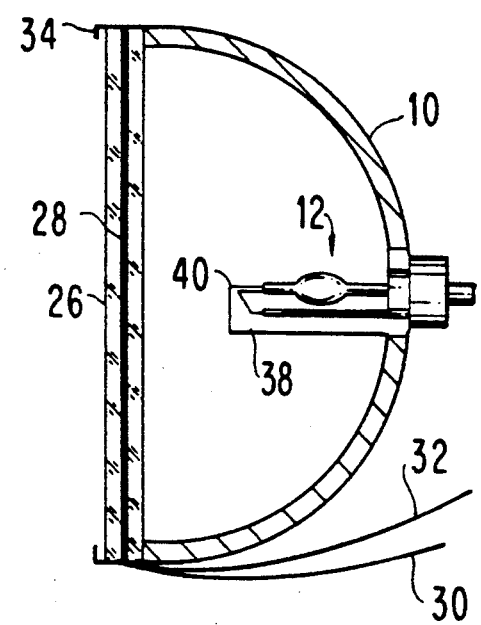
FIG. 3 is a longitudinal cross-sectional view through another embodiment of the headlight according to the invention.

An electrical conductor 28 is arranged on the filter 26, which is connected with the control unit 24 by two electrical lines, a feed line 30 and a return line 32. The electrical conductor 28 can be a conductive strip applied, e.g. deposited, on the filter 26, or a conductive strip enclosed in or part of the filter as shown in the embodiment of FIG. 3. The electrical conductor 28 can also be formed by a transparent metallic layer on the filter 26. Also the electrical conductor 28 can, as shown in FIG. 2, have several segments 28',28'',28''' extending across and over the filter 26. The control unit 24 has a safety circuit 24', by which the current flow through the electrical conductor 28 on the filter is measured through the two electrical lines 30,32. At most the voltage of the motor vehicle applied to the two lines 30,32 and the electrical conductor 28 is the voltage of the power network of the vehicle, usually 12 V. The voltage present in the safety circuit 24' and applied to the electrical conductor 28 and lines 30,32 can be reduced below the usual 12 v of the motor vehicle power supply by a voltage divider circuit, so that there is no danger of contacting the conductor 28. If, for example, the conductor 28 is broken as a result of a break in the filter 26, that break is detected by the safety circuit of the control unit and, because of that, the ignition and/or operation of the gas discharge lamp 12 is blocked by the safety circuit 24' of the control unit 24. The voltage drop across the resistance in the two lines 30,32 and the electrical conductor 28 on the filter 26 is measured by the safety circuit. With the filter 26 mounted correctly a definite voltage drop is observed. If the voltage drop measured is determined to be different from the voltage drop observed with the filter mounted in place, operation of the gas discharge lamp 12 is prevented. It is guaranteed by this arrangement that the gas discharge lamp 12 is not activated by short circuiting the two lines 30,32, when the filter 26 is not mounted or damaged.

The filter 26 is mounted in a holder 34 o the front edge of the reflector 10. The return line 32 and the feed line 30 lead to terminals 36 on the holder. Both ends of the electrical conductor 28 are in contact with the terminals 36 on the holder 34 when the filter 26 is correctly mounted. When the filter 26 is dislodged from the holder 34 as a result of an impact, the two lines 30,32 are disconnected, which is detected by the safety circuit of the control unit 24 which stops the operation of the gas discharge lamp 12.

A light stop 38 can be installed in the reflector 10 for the gas discharge lamp 12. The light stop 38 surrounds the gas discharge lamp 12 on a portion of its periphery. The arrangement relative to the gas discharge lamp 12 and the course of the edge 40 of the light stop 38 determines the shape and course of the light-dark boundary of a light distribution produced by the headlight. The light stop 38 can moreover by formed so that light radiated directly forward from the gas discharge lamp is blocked off.

The electrical conductor 28 on the filter 26 is barely detectable from the outside of the headlight housing, above all when the light window 16 is provided with a scattering or dispersing means.

While the invention has been illustrated and described as embodied in a lighting device for a vehicle, particularly a motor vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

We claim:

1. In a headlight comprising a gas discharge lamp operating as a light source and generating UV radiation, a reflector for collecting and directing light from the light source through an outlet opening and a light window covering the outlet opening, the improvement comprising a disk-like filter, said filter at least partially absorbing the UV radiation generated by the gas discharge lamp in operation and said filter being located between the gas discharge lamp and the light window in a path of light from the light source transmitted directly to the light window and reflected from the reflector; at least one electrical conductor associated with the filter so that, when the filter is broken, the electrical conductor is broken, and a control unit having a safety circuit connected directly to the electrical conductor by two lines, the safety circuit being structured and connected electrically to the gas discharge lamp, so that the gas discharge lamp is turned off by the safety circuit when the electrical conductor is broken.

2. The improvement as defined in claim 1, wherein the filter is mounted on a front edge of the reflector.

3. The improvement as defined in claim 1, wherein the electrical conductor is a conductive strip on the filter.

4. The improvement as defined in claim 1, wherein the electrical conductor is enclosed in the filter.

5. The improvement as defined in claim 3, wherein the electrical conductor has a plurality of segments extending transversely over the filter.

6. The improvement as defined in claim 4, wherein the electrical conductor has a plurality of segments extending transversely over the filter.

7. The improvement as defined in claim 1, wherein the two lines and the electrical conductor on the filter have a predetermined resistance and the safety circuit comprises means for measuring a voltage drop across the predetermined resistance and means for preventing operation of the gas discharge lamp when the voltage drop so determined is different from a voltage drop measured When the electrical conductor has not been broken.

8. The improvement as defined in claim 1, further comprising means for applying a voltage to the electrical conductor and wherein the voltage applied to the electrical conductor on the filter is at most a power supply voltage of the motor vehicle.

9. The improvement as defined in claim 1, further comprising a holder connected with the reflector for the filter and wherein the electrical conductor associated with the filter held in the holder is connected with the two lines and the two lines are disconnected from the electrical conductor when the filter is loosened from the holder.

10. The improvement as defined in claim 1, wherein the filter is provided with a layer of UV radiation absorbing material.

11. The improvement as defined in claim 1, wherein the filter is made from UV radiation absorbing material.

* * * * *